No. 878,778. PATENTED FEB. 11, 1908.
J. DAWSON.
CHANGEABLE GEAR TRANSMISSION MECHANISM.
APPLICATION FILED OCT. 12, 1906.

2 SHEETS—SHEET 1

Witnesses
Walter B. Payne
Russell B. Griffiths

Inventor
James Dawson
by Church & Rich
his Attorneys

No. 878,778. PATENTED FEB. 11, 1908.
J. DAWSON.
CHANGEABLE GEAR TRANSMISSION MECHANISM.
APPLICATION FILED OCT. 12, 1906.

2 SHEETS—SHEET 2.

Witnesses
Walter B. Payne.
Russell B. Griffith

Inventor
James Dawson
By Church Rich
his Attorneys

UNITED STATES PATENT OFFICE.

JAMES DAWSON, OF ROCHESTER, NEW YORK.

CHANGEABLE-GEAR TRANSMISSION MECHANISM.

No. 878,778.  Specification of Letters Patent.  Patented Feb. 11, 1908.

Application filed October 12, 1906. Serial No. 338,532.

*To all whom it may concern:*

Be it known that I, JAMES DAWSON, of Rochester, in the county of Monroe and State of New York, have invented certain new and useful Improvements in Changeable-Gear Transmission Mechanism; and I do hereby declare the following to be a full, clear, and exact description of the same, reference being had to the accompanying drawings, forming a part of this specification, and to the reference-numerals marked thereon.

My present invention relates to variable speed transmission mechanism such as are commonly applied to internal combustion engines to transform the high speed at which they are normally and almost necessarily run to various graduations thereof at the will of the operator whereby the greatest efficiency of the engine is developed and maintained, at the same time affording perfect control of the power generated as imparted in greater or less degree to the driven mechanism, and it has for its object to provide a simply constructed yet strong and durable device of this nature which will be positive in its operation and by means of which the various speeds in both directions may be controlled by the movements of a single operating medium.

A further object of my invention is to provide a construction wherein the coöperating gears are constantly in mesh and the interlocking relatively movable toothed members by means of which each group may be successively thrown into working combination, are so arranged as to make stripping of the teeth practically impossible.

To these and other ends the invention consists in certain improvements and combinations of parts, all as will be hereinafter more fully explained, the novel features being pointed out in the claims at the end of the specification.

Figure 1:
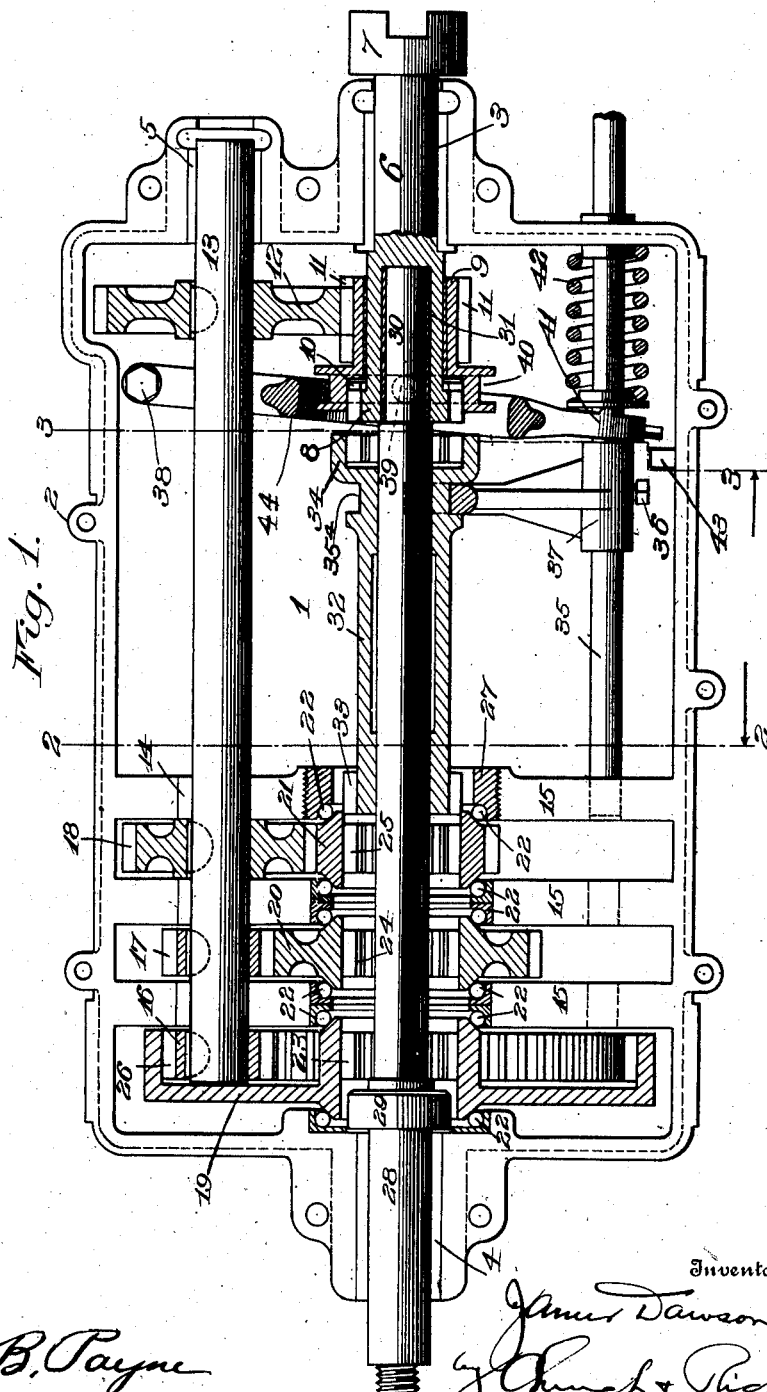
Figure 2:
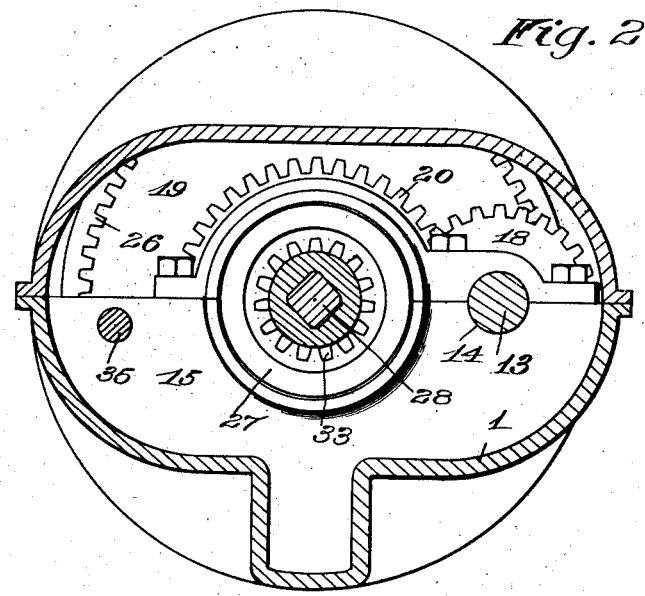
Figure 3:
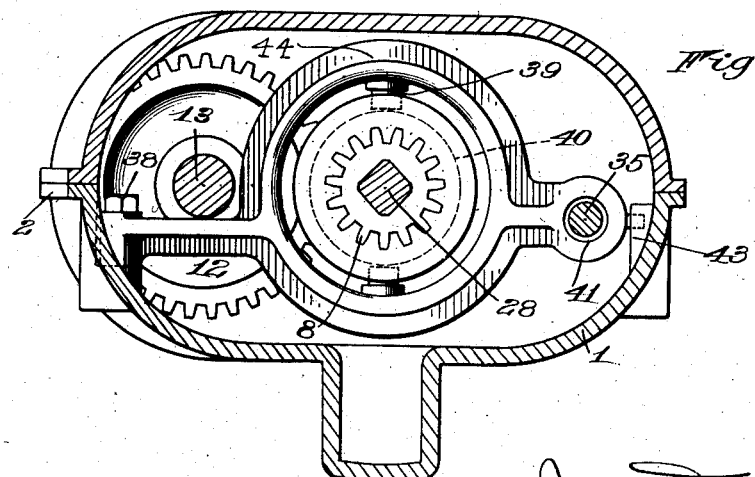

Figure 1 is a central longitudinal sectional view of a transmission mechanism constructed in accordance with my invention, the top of the casing being removed. Fig. 2 is a transverse section on the line 2—2 of Fig. 1. Fig. 3 is a similar view on the line 3—3 of Fig. 1.

Similar reference numerals in the several figures indicate similar parts.

In carrying out my invention I employ generally, a driving shaft coupled directly or indirectly to the engine, a driven shaft arranged in alinement therewith and having its adjacent end journaled therein and a counter shaft provided with a series of fixed gears in constant mesh with a corresponding series of ring gears surrounding the driven shaft. Motion is transmitted to the latter by means of a sliding gear locked thereon which is moved successively into engagement with the inner teeth of the ring gears, while its extreme movement in an opposite direction couples the two shafts for a direct drive or high speed, at the same time actuating mechanism for simultaneously throwing out the drive of the counter shaft.

Referring to the drawings 1 indicates a gear case of suitable design and configuration, but preferably constructed in halves and bolted together through corresponding lugs 2 in the usual manner, projecting portions at either end thereof forming split bearings 3, 4 and 5. The driving shaft 6 is comparatively short and is rigidly supported in the bearing 3, the latter being made sufficiently long for the purpose, the outer end being provided with a coupling 7 for its connection with a clutch or to the engine shaft, while the inner end is provided with teeth forming an integral gear or clutch member 8. Loosely mounted on the shaft 6 is a sleeve 9 provided with gear teeth and of such shape as to form integrally therewith, the clutch member or internal gear 10 adapted to coöperate with the gear 8, and a gear 11 meshing with a pinion 12 on the countershaft 13. The gear 11 is of such a width as to be constantly in mesh with the pinion 12 though allowing gears 8 and 10 to be disengaged by sliding of the sleeve 9.

The countershaft 13 is supported in bearing 5 and in bearings 14 mounted in transversely extending webs 15 formed integrally with the casing and at the opposite end from the pinion 12 is provided with a plurality of fixed pinions which in the present instance comprise the reversing pinion 16, low speed pinion 17 and intermediate pinion 18. These are in constant mesh with a corresponding number of ring gears 19, 20 and 21 respectively, arranged between the webs 15 and supported in ball bearings 22 therein. These gears are provided with interior teeth 23, 24 and 25 respectively, of uniform pitch and are similar, other than in size, excepting that the gear 19 is provided with a second set of interior teeth 26 which mesh with the reversing pinion 16 on the countershaft 13 and cause these two to operate in the same instead of opposite directions. Compensation for wear in the bearings 22 is universally effected by means of the usual adjusting cone 27 threaded in the initial web 15.

The driven shaft 28 is supported at one end in the bearing 4 wherein it is prevented from longitudinal movement by a thrust collar 29 while the opposite end is provided with a reduced portion 30 for which a bearing is arranged in a recess 31 on the end of the driving shaft 6 by means of which connection the shafts are mutually supported in the interior of the case though free to rotate independently of each other. This shaft 28 extends concentrically through the ring gears 19, 20 and 21 and from the collar 29 to the reduced portion 30 is prismatic in cross section whereby a sliding sleeve 32 mounted thereon is locked against independent rotation. One end of this sleeve is provided with gear teeth 33 of a pitch equal to that of the internal gears 23, 24, 25 whereby a clutch connection may be established between any one of these and the sleeve (and hence the shaft 28) by sliding the sleeve in proper relation thereto. The opposite end of the sleeve is provided with a clutch member 34 having internal teeth adapted to lock with the gear 8, (integral with the driving shaft 6) when the sleeve is moved in that direction whereby shafts 6 and 28 are coupled for a direct drive.

Longitudinal movement of the sleeve 32 in either direction is effected by means of a push rod 35, mounted in the casing to extend preferably through one of the webs 15. Upon the rod is adjustably secured by means of a set screw 36, an arm 37 the end of which engages a circumferential groove or channel 35ᶜ in the sleeve whereby the sleeve is free to rotate without disturbing the contact. The rod is suitably connected to be manually operable if desired by means of a lever or other devices.

The operation of the mechanism so far described will now be explained. For this purpose it will be assumed that the sleeve is moved to a position wherein the teeth 33 thereon are out of contact and between the ring gears 23 and 24, this being the neutral position, and that the driving shaft is rotating. Movement would therefore be communicated through the gear 11 to the pinion 12 on the countershaft 13, to the pinions 16, 17 and 18 thereon and thence to the ring gears 19, 20 and 21 which would be running free. By an operation of the lever in the proper direction, the teeth 33 on the sleeve clutch the ring gear 20 whereby the driven shaft 28 is rotated at the speed imparted by the low gear pinion 17. A further movement similarly throws in the intermediate speed pinion and gear 18 and 21 respectively while the limit of motion is reached when the sleeve is so far advanced as to allow the clutch member 34 on its opposite end to engage the gear member 8 on the shaft 6, displacing the clutch member 10 and throwing out the countershaft though the gear 11 will still be in mesh with the pinion 12 as before mentioned, the sleeve 9 remaining idle while the driving and driven shafts are thereby directly connected for high speed. A reverse movement of the sleeve 32 from neutral, similarly locks the ring gear 19 rotating the countershaft in the opposite direction to reverse the movement of the driven shaft 28.

To positively effect the displacement of the clutch member 10 when a direct connection is desired and leave the member 8 on the driving shaft free to receive its connection I employ an auxiliary means for sliding the sleeve 9 embodying in the present instance a yoke 44 (shown in Fig. 3) surrounding the latter and pivoted to the casing as at 38. It is provided with inwardly-extending studs or projections 39 which enter a circumferential groove 40 arranged conveniently on the sleeve 9 whereby the latter is free to rotate but is moved longitudinally by movement of the yoke upon its pivot. An extension of the yoke is provided with an eye 41 through which passes the rod 35 carrying a helical spring 42 that abuts the wall of the casing and tends to force the yoke in such a direction as will keep the members 8 and 10 normally in engagement for operation of the countershaft, a stop 43 being provided to limit its action. When the rod 35 is operated to throw in the direct drive, the arm 37 thereon engages the eye 41 and forces the yoke along against the tension of the spring 42 and displaces the member 10 for the purposes described.

It will be understood that while I have referred to the interlocking parts shown in the drawings as gears having internal or external teeth such as parts 8 and 10, their functions are not essentially such, being practically clutch elements and subject to variations in form and operation. However, all the teeth on these coöperating parts are made to engage simultaneously whereby stripping is prevented, the meshing gears rotating in opposite directions being in constant engagement through every operation.

I claim as my invention:

1. In a power-transmitting mechanism, the combination with a driving shaft, a counter shaft operated thereby and a driven shaft, of a plurality of ring gears of uniform interior diameter arranged to encircle the driven shaft and operated by the countershaft, bearings for the gears independent of the driven shaft clutch devices on the inner circumferences of said gears, a sliding clutch member secured against rotation on the driven shaft and adapted to separately engage the clutch devices on the gears to interlock the latter and the driven shaft and means for operating said sliding member.

2. In a power-transmitting mechanism, the combination with a casing having transversely-extending webs or walls therein, and a driving shaft, a countershaft operated thereby and a driven shaft journaled in said casing, of a ring gear located between said webs and mounted in bearings in the latter to encircle the driven shaft and operated by the countershaft and means for interlocking said ring gear and the driven shaft.

3. In a power-transmitting mechanism, the combination with a casing having transversely-extending webs and a driven and driving shaft journaled therein, of a plurality of ring gears mounted in bearings between the webs encircling the driven shaft, a countershaft journaled in bearings in said webs and projecting beyond the outer one, gears on the countershaft meshing with said ring gears to rotate the driven shaft in an opposite direction from the countershaft when said ring gears are locked upon the latter, a ring gear mounted exteriorly of the webs and provided with interior teeth, a gear on the projecting end of the countershaft meshing with said teeth to rotate the last-mentioned ring gear in the direction of rotation of the countershaft and means for independently locking any of the ring gears to the driven shaft.

4. In a power-transmitting mechanism, the combination with a support, a driving shaft carried thereby and provided with a clutch member, a driven shaft journaled in alinement with the driving shaft and a countershaft, of a gear rotatably mounted on the driving shaft for operating the countershaft and forming a sliding sleeve, a clutch member on said sleeve adapted to operate in sliding engagement with the clutch member on the driving shaft and a clutch member on the driven shaft also movable into engagement with the clutch member on the driving shaft and abutting the clutch member on the sleeve to simultaneously disengage it from the latter.

5. In a power-transmitting mechanism, the combination with a support, a driving and a driven shaft journaled in alinement therein, a fixed clutch member on one of said shafts, sliding clutch members on each adapted to coöperate therewith, a countershaft operated by the sliding member on the driving shaft and means for operating one of said sliding members into engagement with the fixed clutch member, of a lever operated by said means pivoted to the support and engaging the other to simultaneously move it longitudinally out of engagement with the fixed clutch member.

6. In a power-transmitting mechanism, the combination with a support, a driving and a driven shaft journaled therein, a fixed clutch member on one of said shafts, a sliding clutch member on each of them adapted to coöperate therewith, and a countershaft operated by the sliding member on the driving shaft of a push rod provided with an arm for operating one of said sliding clutch members, an operating lever for the other pivoted to the support and adapted to be engaged by the push rod to move it in one direction and a spring interposed between said lever and the support normally tending to force it in the other direction.

7. In a power-transmitting mechanism, the combination with a support, a driving and a driven shaft journaled therein, a fixed clutch member on one of said shafts, a sliding clutch member on each of them adapted to coöperate therewith, and a countershaft operated by the sliding member on the driving shaft of a push rod provided with an arm for operating one of said sliding clutch members, an operating lever for the other pivoted to the support and adapted to be engaged by the push rod to move it in one direction, a spring interposed between said lever and the support normally tending to force it in the opposite direction and a stop on the latter for limiting the action of the spring.

8. In a power-transmitting mechanism, the combination with a driving shaft, a countershaft operated thereby and a driven shaft journaled in alinement with the driving shaft, of a plurality of fixed gears on the countershaft, a plurality of loose gears encircling the driven shaft coöperating therewith and provided with clutch members, a clutch member on the driving shaft and a sliding clutch member on the driven shaft operating to engage with the latter when moved in one direction and to engage with the clutch member on each of the gears encircling the driven shaft, selectively, when operated in the other direction.

9. In a power-transmitting mechanism, the combination with a driving shaft, a driven shaft journaled in alinement therewith and a countershaft, of a gear fixed on the driving shaft, a loose, sliding gear mounted thereon for operating the countershaft and provided with internal teeth for engagement with the fixed gear on the driving shaft when operated longitudinally of the shaft, a sliding internal gear on the driven shaft also adapted to engage on the gear fixed on the driving shaft and means for operating one of the sliding gears longitudinally.

JAMES DAWSON.

Witnesses:
RUSSELL B. GRIFFITH,
FLORENCE E. FRANCH.